(12) United States Patent
Shen et al.

(10) Patent No.: US 10,345,859 B2
(45) Date of Patent: Jul. 9, 2019

(54) DISPLAY PROCESSING METHOD, APPARATUS AND PROGRAM PRODUCT FOR A BENDABLE ELECTRONIC DEVICE

(71) Applicant: Lenovo (Beijing) Limited, Beijing (CN)

(72) Inventors: Wenjing Shen, Beijing (CN); Wenchao Ma, Beijing (CN); Feng Chen, Beijing (CN); Xiaotian Zhu, Beijing (CN); Guanchen Yang, Beijing (CN); Jie Xia, Beijing (CN); Sheng Yang, Beijing (CN); Zhixiang Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 99 days.

(21) Appl. No.: 15/372,696

(22) Filed: Dec. 8, 2016

(65) Prior Publication Data

US 2017/0160770 A1    Jun. 8, 2017

(30) Foreign Application Priority Data

Dec. 8, 2015  (CN) .......................... 2015 1 0898479
Dec. 30, 2015 (CN) .......................... 2015 1 1021164
Dec. 31, 2015 (CN) .......................... 2015 1 1032356

(51) Int. Cl.
*G06F 1/16*    (2006.01)
*G06F 3/03*    (2006.01)

(52) U.S. Cl.
CPC ............ *G06F 1/1652* (2013.01); *G06F 1/163* (2013.01); *G06F 1/1643* (2013.01); *G06F 1/1684* (2013.01); *G06F 3/03* (2013.01)

(58) Field of Classification Search
CPC ...... G06F 1/1652; G06F 1/163; G06F 1/1684; G06F 3/03; G06F 1/1643
See application file for complete search history.

(56) References Cited

U.S. PATENT DOCUMENTS

| 9,228,907  | B2 * | 1/2016 | Salo ........................ G01L 1/04 |
| 9,448,660  | B2 * | 9/2016 | Seo ....................... G06F 3/0487 |
| 9,652,135  | B2 * | 5/2017 | Seo ....................... G06F 3/04847 |
| 9,939,953  | B2 * | 4/2018 | Abe ........................ G09G 5/363 |
| 9,959,030  | B2 * | 5/2018 | Sang ..................... G06F 1/3206 |
| 2013/0127918 | A1 * | 5/2013 | Kang ................... G06F 3/0481 345/660 |
| 2014/0055375 | A1 * | 2/2014 | Kim ..................... G06F 1/1652 345/173 |

(Continued)

FOREIGN PATENT DOCUMENTS

CN          103946780 A    7/2014

*Primary Examiner* — Sardis F Azongha
(74) *Attorney, Agent, or Firm* — Kunzler, PC

(57) ABSTRACT

A display method, apparatus, and program product for a bendable electronic device. The method determines whether a display of a bendable electronic device is in a planar first form or in a curved second form. The method displays a first interface of a first application in response to determining that the display is in the planer first form. The method displays a second interface that is available in the first application, the second interface adaptive to the curve second form, in response to determining that the display is in the curved second form is disclosed. An apparatus and/or a program product may perform the method.

20 Claims, 6 Drawing Sheets

(56) References Cited

U.S. PATENT DOCUMENTS

| | | | | |
|---|---|---|---|---|
| 2015/0227271 A1* | 8/2015 | Kang | ............... | G06F 3/0482 |
| | | | | 715/781 |
| 2015/0227286 A1* | 8/2015 | Kang | ............ | H04M 1/0214 |
| | | | | 715/781 |
| 2015/0316958 A1* | 11/2015 | Takesue | ............ | G06F 3/044 |
| | | | | 345/173 |
| 2015/0338888 A1* | 11/2015 | Kim | ............... | G06F 1/1677 |
| | | | | 345/156 |

* cited by examiner

DISPLAY PROCESSING METHOD, APPARATUS AND PROGRAM PRODUCT FOR A BENDABLE ELECTRONIC DEVICE

FIELD

The subject matter disclosed herein relates to the field of electronic devices, and more particularly, to an electronic device and a display processing method.

BACKGROUND

Currently, electronic devices, such as a smart watch, usually comprise a rigid display screen, and a product therefrom is relatively single. Moreover, in such electronic devices, the displayed application interface does not change with the different physical forms of the electronic devices.

SUMMARY

A method for display processing for a bendable electronic device is disclosed. In one embodiment, the method determines whether a display of a bendable electronic device is in a planar first form or in a curved second form. The method displays a first interface of a first application in response to determining that the display is in the planer first form. The method displays a second interface that is available in the first application, the second interface adaptive to the curve second form, in response to determining that the display is in the curved second form.

In some embodiments, determining that the display of the bendable electronic device is in the curved second form includes determining that a bending degree of the display exceeds a predetermined threshold. In some embodiments, the bending degree of the display is determined by measuring a difference in light received at a plurality of light sensors comprised with the bendable electronic device and/or by measuring an output of a bend sensor within the bendable electronic device.

In some embodiments, the method further includes displaying one or more third interfaces corresponding to one or more second applications in response to determining that the first application does not include an available second interface adaptive to the curved second form. In some embodiments, displaying the one or more third interfaces corresponding to the one or more second applications include obtaining identifying information for one or more second applications and displaying an application selection interface for the one or more second applications based on the identifying information.

In some embodiments, the method further includes determining, for the one or more second applications, one or more of an application usage frequency, an application type, and a working mode. In some embodiments, the method further includes determining whether a predetermined condition for the one or more second applications is met, and switching the one or more second applications from a first working mode to a second working mode in response to determining that the predetermined condition is met. In some embodiments, the first working mode and the second working mode have different power consumptions. In some embodiments, the predetermined condition comprises one or more of passing a predetermined time, receiving a predetermined input, and detecting a predetermined movement.

In some embodiments, the method further comprising transferring data for the first application over a wireless network connection. In some embodiments, in the second curved form, the bendable electronic device is wearable around a body part of a user.

In one embodiment, an apparatus is disclosed that includes a sensing module that determines whether a display of a bendable electronic device is in a planer first form or in a curved second form. In the embodiment, the apparatus further includes a processing module that determines whether a first application comprising a first interface further comprises an available second interface adaptive to the curved second form. In the embodiment, the apparatus further includes a display module that displays the first interface of the first application in response determining that the display of the bendable electronic device is in the planar first form. In the embodiment, the display module further displays one or more third interfaces corresponding to one or more second applications in determining that the bendable electronic device is in the curved second form and in response to determining that the first application does not comprise an available second interface adaptive to the curved second form.

In some embodiments, the processing module further obtains identifying information for one or more second applications; and causes the display module to display an application selection interface for the one or more second applications. In some embodiments, the processing module further determines whether a predetermined condition is met for the one or more second applications, and causes the one or more second applications to switch from a first working mode to a second working mode in response to determining that the predetermined condition is met. In some embodiments, the bendable electronic device includes a wireless communication interface. In some embodiments, in the second curved form, the bendable electronic device is wearable around a body part of a user.

In one embodiment, a program product is disclosed. In the embodiment, the computer program product comprises a computer readable storage medium that stores code executable by a processor, the executable code comprising code to perform determining whether a bendable electronic device comprising a display is in a planar first form or a curved second form. In the embodiment, the code is executable to further perform displaying a first interface of a first application in response to determining that the bendable electronic device is in the planer first form. In the embodiment, the code is executable to further perform displaying an available second interface of the first application, adaptive to a second curved form, in response to determining that the bendable electronic device is in the curved second form.

Some preferred but optional features or steps of the present application have been defined in the dependent claims.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, embodiments will be described and explained with additional specificity and detail through the use of the accompanying drawings, in which.

DETAILED DESCRIPTION

Figure 1A:
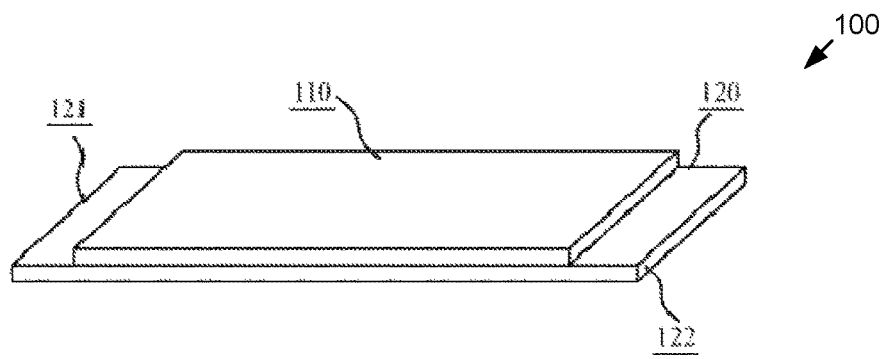
FIG. 1A is a schematic block diagram illustrating one embodiment of a bendable electronic device comprising a display in a planar first form.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

In some embodiments, a bendable electronic device comprising a display and embodiments of methods of operating the display may be described with reference to examples involving a wearable electronic device such as, for example, a cell phone that may be adaptable to be worn as a smart watch/wristband around a user's wrist. However, those skilled in the art may appreciate that the present invention is not limited to such examples, and may be applied to various other bendable electronic devices.

FIG. 1A is a schematic block diagram illustrating one embodiment of a bendable electronic device comprising a display in a planar first form.

Figure 1B:
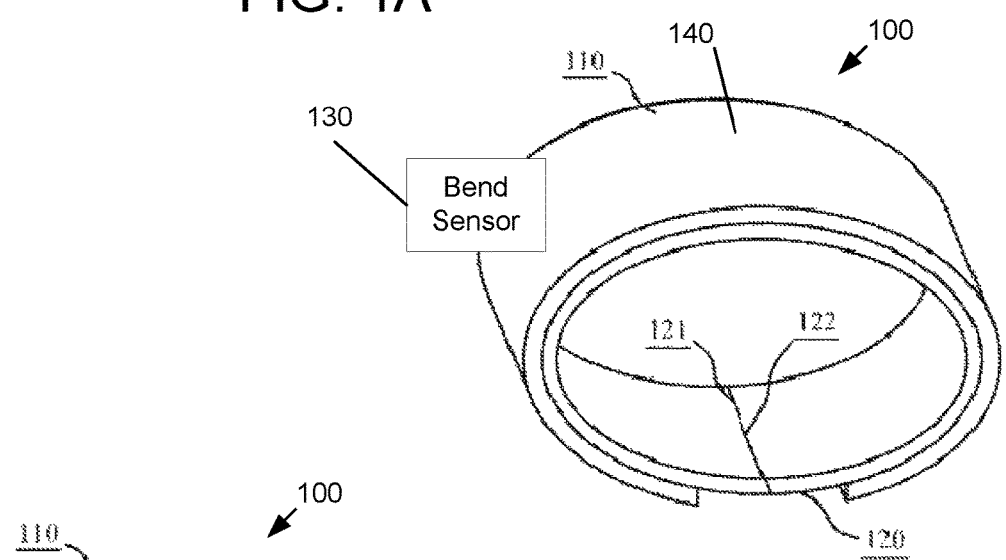
FIG. 1B is a schematic block diagram illustrating one embodiment of a bendable electronic device comprising a display in a curved second form.

FIG. 1B is a schematic block diagram illustrating one embodiment of a bendable electronic device comprising a display in a curved second form.

Figure 1C:
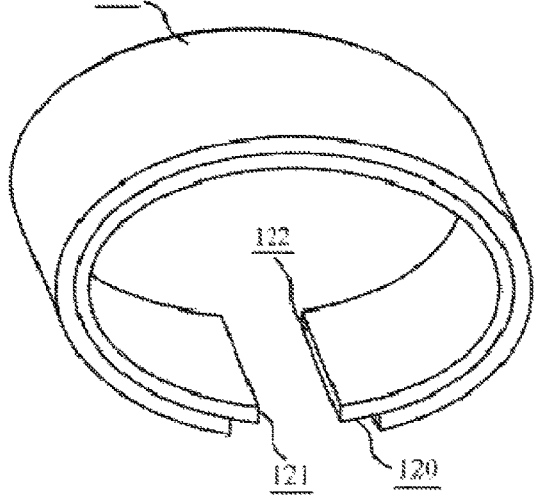
FIG. 1C is a schematic block diagram illustrating another embodiment of a bendable electronic device comprising a display in a curved second form.

FIG. 1C is a schematic block diagram illustrating another embodiment of a bendable electronic device comprising a display in a curved second form.

In some embodiments, the bendable electronic device 100 comprises a display 110, configured to display an interface of various applications in the electronic device. Moreover, in one embodiment, the electronic device has at least two forms. In the first form, as shown in FIG. 1A, the display 110 is in a planar or near planar state; that is, an included angle between two planes of two opposite ends of the display 110 (e.g. the two ends nearest to 121 and 122 respectively in FIG. 1A) is larger than a threshold value, such as for example, 170 degrees. As used herein, the term "planar first form" may to a generally planar or nearly planar form.

In the second form, as shown in FIGS. 1B and 1C, the display 110 may be in a curved surface state. Specifically, when the electronic device is in the second form, the display apparatus may be in an annular state or near annular state. As used herein, the term "curved second form" may refer to a generally annular or nearly annular form.

In some embodiments, a parameter may be accessed to determine whether the display 110 meets a first predetermined condition. For example, in some embodiments, a predetermined condition may be that the bendable electronic device 100 including display 110, is in the planar first form. In some embodiments, the predetermined condition may be that the bendable electronic device 100 including display 110, is in the curved second form.

In some embodiments the bendable electronic device 100 including display 110 further includes a support component 120 for supporting the display 110. The display 110 may be arranged on one surface of the support component 120, which may also have two forms. In the planar first form, as shown in FIG. 1A, the support component 120 may be in a planar or near planar state. In the second form, as shown in FIGS. 1B and 1C, the support component 120 may be in a curved surface state.

Hence, in the curved second form, the support component 120 achieves both an effect of supporting the display 110 and a limiting effect, to hold the bendable electronic device 100 around of a columnar object, such as for example, the arm or wrist of a user, to prevent the bendable electronic device 100 from falling off the columnar object, e.g. falling off the user's wrist.

In some embodiments, the support component 120 has two ends 121 and 122 that may be connected together to hold the bendable electronic device 100 around the periphery of the columnar object. For example, in a case that the columnar object is the arm of a user, the electronic device meets the first predetermined condition, that is, the diameter of a formed ring is larger than or equal to that of the arm of the user and smaller than that of a fist of the user such that the bendable electronic device 100 in the curved second for may be held on the arm or wrist of the user.

In another embodiment, as shown in FIG. 1C, the two ends 121 and 122 of the support component 120 may be unconnected and separated by a finite distance, thereby forming a near annular space. In some embodiments, in which the bendable electronic device 100 may be nearly annular in the curved second form a first predetermined condition e.g. being sufficiently annular to be held around the arm or wrist of the user, made be met.

It may be noted that embodiments illustrated in FIG. 1A to 1C are merely examples. The support component 120 may be embodied in various matters. For example, in some embodiments, it may be unnecessary for the support component 120 to provide support under the all of the display 110. In some embodiments the support component 120 may surround the display 110 as a frame. In other words, the display 110 may be framed by the support component 120.

In some embodiments, the bendable electronic device 100 may be in a planar first form or curved second form without needing to comprise any support component 120. Thus, various products beyond those illustrated may be designed consistent with the teachings described.

Figure 2A:
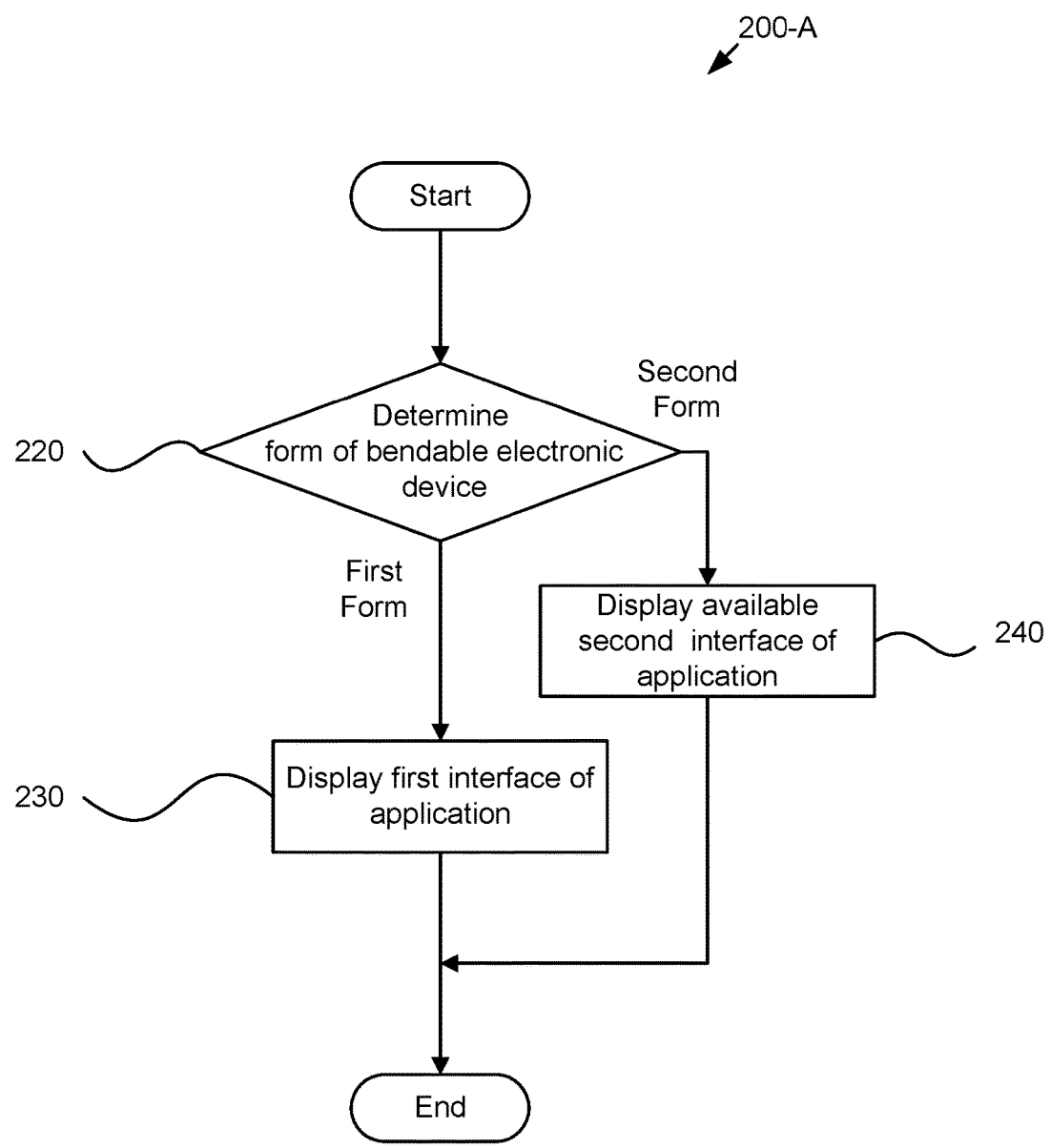
FIG. 2A is a schematic flow chart diagram illustrating one embodiment of a method of operating a display of a bendable electronic device depending on its form.

FIG. 2A is a schematic flow chart diagram illustrating one embodiment of a method 200-A of operating a display of a bendable electronic device 100 depending on its form. The method 200-A begins and determines 220 whether a bendable electronic device 100 comprising a display 110 is in a planar first form or a curved second form. The method 200-A displays 230 a first interface of a first application in response to determining that the bendable electronic device is in the planer first form. The method 200-A displays 240 an available second interface of the first application, adaptive to a second curved form, in response to determining that the bendable electronic device is in the curved second form.

In some embodiments, determining 220 whether the bendable electronic device 100 is in the planer first form or curved second form may comprise determining a bending degree of the display exceeds a predetermined threshold. In some embodiments, the bendable electronic device 100 may include a bend sensor 130 arranged in the display 110 or support component 120. For example, the bend sensor 130 may be an angle sensor that senses a bending angle of the display apparatus or support component at a particular point in time. Thus, the method 200-A may access 220 a parameter of the bend sensor 130 to determine at a particular point in time whether the bending angle exceeds a predetermined angle threshold value. One of skill in the art may utilize various type of bend sensors to that major a bending angle.

In another embodiment, the bendable electronic device 100 may comprise a photosensitive unit. The photosensitive unit may comprise a plurality of sensors forming a light detection array. The plurality of sensors forming light detection array may be arranged in a manner corresponding to a light emitting array of the display 110. In response to the display 110 of the bendable electronic device 100 being in the first form, a brightness detected by each point in the light detection array may be generally consistent.

Correspondingly, in response to the display 110 of the bendable electronic device 100 being in the curved second form, a brightness detected by each point in the light detection array may vary. For example, in the curved second form, a brightness detected at a point of the light detection array facing a light source may be generally consistent across the region of the light detection array that is facing the light source. Moreover, the brightness of light at a point of the light detection array facing the light source may be greater than the brightness of light at a point of the light detection array not facing the light source.

In some embodiments, as the bending of the display 110 increases, a region of the light detection array facing the light source may decrease and/or the brightness of the light at a particular point of the light detection array that is not directly facing the light source may decrease. In some embodiments, the light detection array may be configured to determine the form of the bendable electronic device 100 by measuring a region of the light detection array in which a measured brightness exceeds a predetermined threshold value. The predetermined threshold value measured of brightness or area facing the light may be a fixed threshold value or a relative threshold value to another point in the light detection array or relative to a prior measurement.

In some embodiments, displaying 230 a first interface of a first application in response to determining that the bendable electronic device is in the planer first form may include displaying an interface of one or more applications of various types, such as for example, a system application, a factory-installed application, a user-installed application, and so forth. In some embodiments, a first application may include a first interface suitable for a first form, such as a planar first form like that illustrated in FIG. 1A. In some embodiments, the first application may further include a second interface adaptive to a curved second form, for example such as illustrated in FIGS. 1B and 1C. In some embodiments, the first application may include first interface adaptive to a planar first form and second interface adaptive to a curved second form.

For example, in one embodiment, in which the display 110 is in a planar first form, a user may readily see a whole display region of the display 110. Accordingly, in some embodiments, a first interface adaptive to the planer first form may be an interface capable of displaying a large amount of detailed information. When the display 110 is in the curved second form, a user may readily see only a particular portion of a display region of the display 110 that is facing the user. Accordingly, a second interface for the first application adaptive to the curved second form may be an interface displaying a small amount of information, such as for example, a thumbnail interface, an icon, or the like.

In one embodiment, in which the bendable electronic device 100 is in the planer first form, a user may hold the bendable electronic device 100 in a relatively static state, for example by holding it in his or her hand. Thus, the first interface adaptive to the planer first form may include text having smaller font sizes than may be suitable if the bendable electronic device 100 were subject to frequent movement. In some embodiments, a first interface adaptive to the planer first form may include a larger number of colors than may be readily distinguishable by the user if the bendable electronic device 100 were subject to frequent movement.

In the curved second form, a user may wear the bendable electronic device 100 around his or her wrist such that it is subject to frequent movements of the wrist. Accordingly, in some embodiments a second interface adaptive to the curved second form may be for example, an interface displayed in large fonts, or an interface displayed in bright colors for the user's viewing convenience when the bendable electronic device 100 is subject to movement.

In some embodiments, in which the bendable electronic device 100 is in the planer first form, the distance between each point of the display 110 and user eyes may be approximately equal. Accordingly, a first interface of a first application adaptive to the planer first form may not require any compensation for vision distortion due to curvature of display 110. Thus, the first interface may utilize conventional display image processing.

In the curved second form, the distance between each point of the display apparatus in the planar state and user eyes may be noticeably different. Accordingly, a second interface of the first application adaptive to the curved second form may be for example, an interface that compensates for various distortions, for example such as trapezoid distortion, by distortion correction processing.

In some embodiments, various methods of distortion correction processing known to those skilled in the art may be utilized, without the necessity of describing details of such processing herein. The embodiments described above are merely examples. Those skilled in the art may design interfaces suitable for the planer first form and the curved second form of the bendable electronic device 100 taking into account differences in physical states and use-scenarios between the first form and the second form.

In some embodiments, the bendable electronic device 100 may operate initially in the planer first form and may at a particular point in time switch to operate the curved second form. A first type of application may be an application that includes a first interface for the display 110 that is adaptive to the planer first form. Such applications may include systems applications, factory installed applications, user installed applications, and so forth. Examples of systems applications, factory installed applications and user installed applications are described in more detail with respect to FIGS. 3A to 3H.

In some embodiments, an application may include interface information. For example, in one embodiment, a first application that has an interface adaptive to the planar first form may include information about whether the first application has an available second interface for the curved second form. In one embodiment, an interface parameter may be accessed to determine whether the first application includes an available interface adaptive to the curved second form.

In another embodiment, the method 200-A may send a query as to whether the second interface adaptive to the curved second form of display 110 exists in the first application at a system level at a point at which the form parameter accessed indicated that the electronic device has switched from the first form to the second form, and the first application responds to the query request and returns to the system level. Other methods to access a parameter to determine whether the first application has the second interface adaptive to the second form may be understood by those skilled in the art.

Thus, method 200-A may accommodate a user's habits and improve the user's experience by displaying a first interface that is suitable and adaptive to the planar first form and displaying a second interface adaptive to the curved second form if the display 110 of the bendable electronic device 100 is in the curved second form.

Figure 2B:
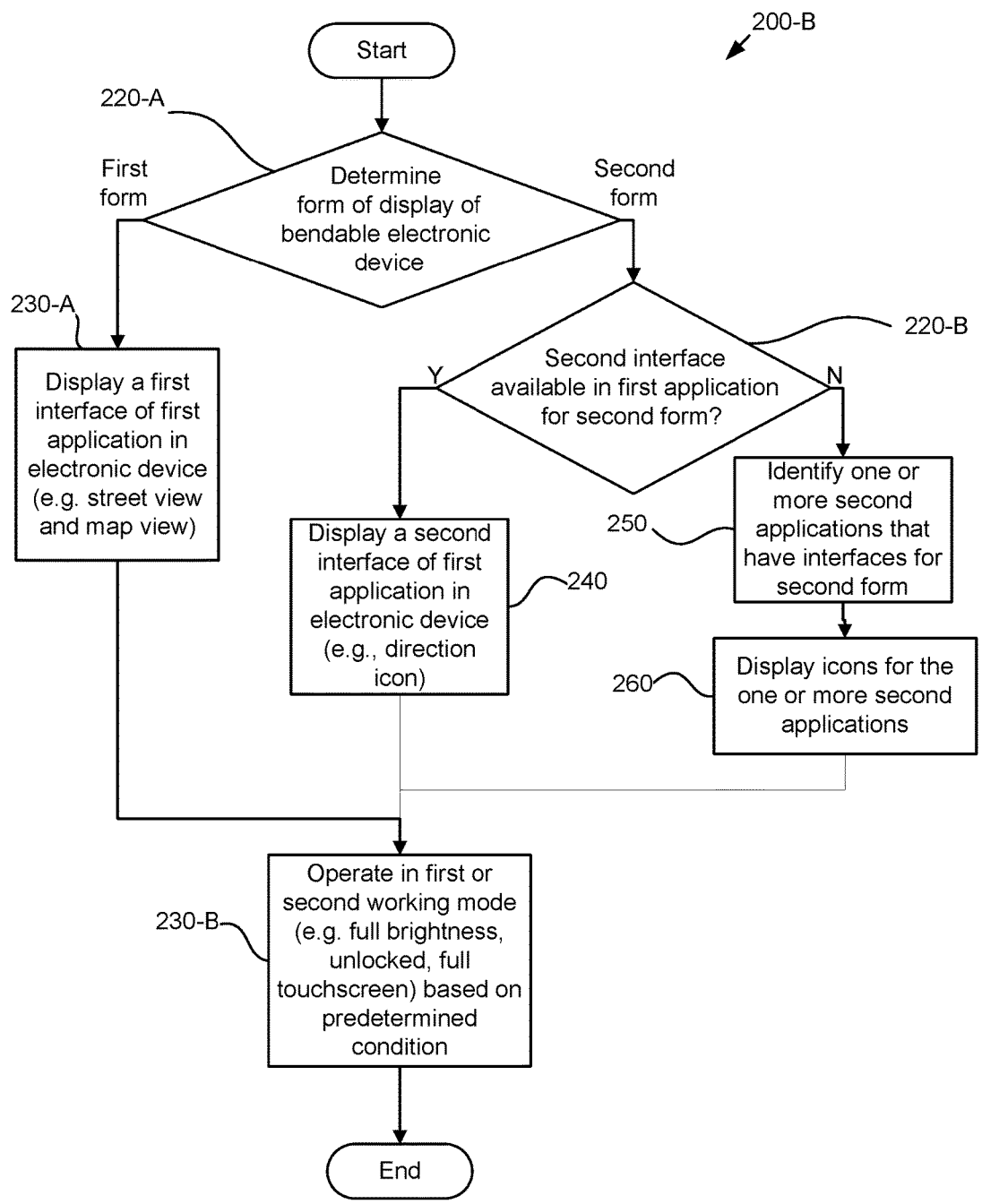
FIG. 2B is a schematic flow chart diagram illustrating another embodiment of a method of operating a display of a bendable electronic device depending on its form.
Figure 3A:
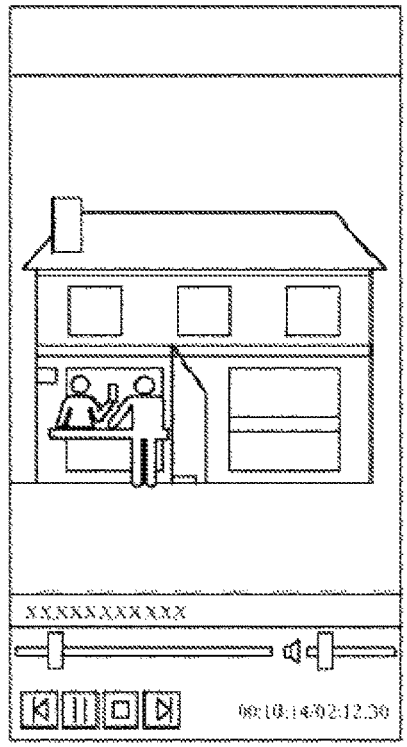
FIG. 3A is a schematic block diagram illustrating one embodiment of a method of operating a display of a bendable electronic device in a planar first form.
Figure 3B:
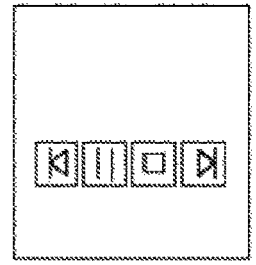
FIG. 3B to FIG. 3F are schematic block diagrams illustrating other embodiments of a method of operating display of a bendable electronic device in a curved second form.
Figure 3C:
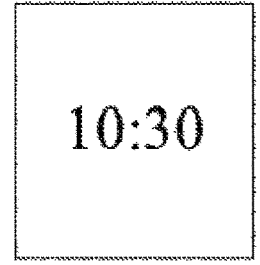
Figure 3D:
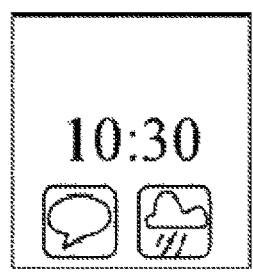
Figure 3E:
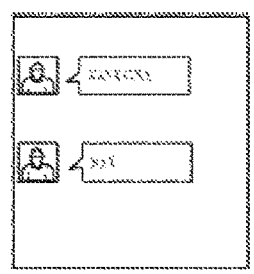
Figure 3F:
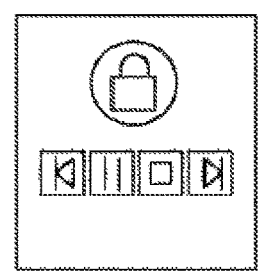
Figure 3G:
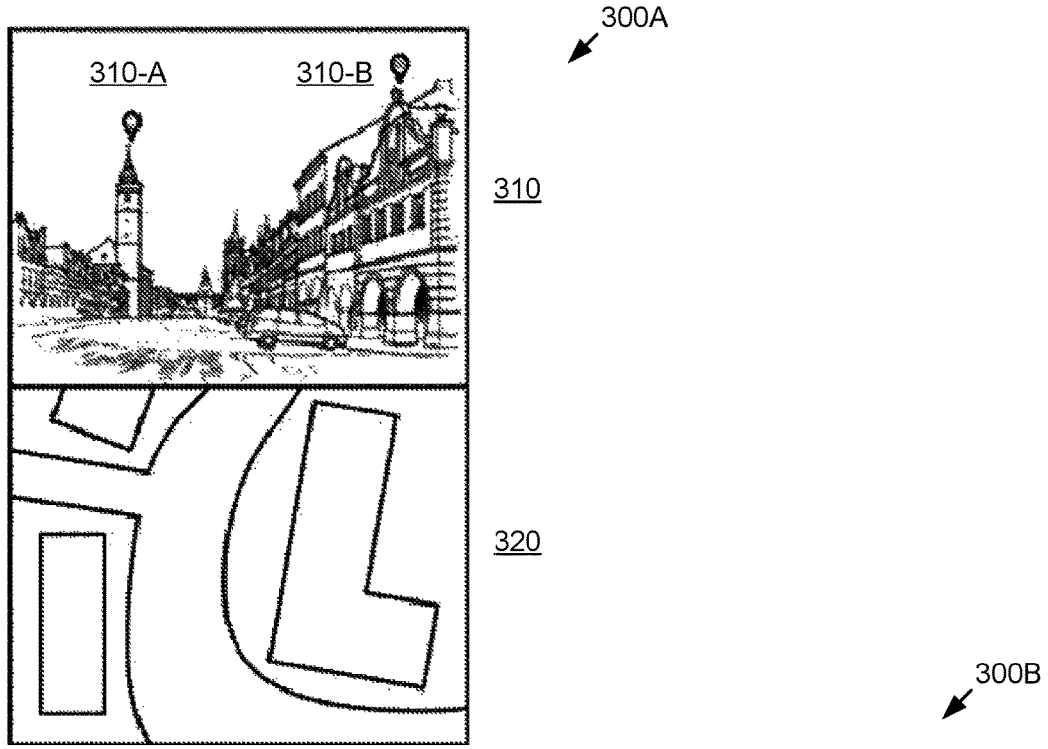
FIG. 3G is a schematic block diagram illustrating an embodiment of a method of operating a display of a bendable electronic device in a planar first form.

Referring now to FIGS. 2B, and 3A to 3H, additional embodiments of methods for displaying interfaces on a display 110 of a bendable electronic device 100 are described. FIG. 2B is a schematic flow chart diagram illustrating another embodiment of a method 200-B of operating a display 110 of a bendable electronic device 100 depending on its form. The method 200-B begins and determines 200-B whether the display 110 of a bendable electronic device 100 is in a planar first form or a curved second form. The method 200-B displays 230-A a first interface of a first application in response to determining that the display is in the planer first form. One example of displaying a first interface the first application is illustrated in FIG. 3G.

FIG. 3G is a schematic block diagram illustrating an embodiment of a method of operating a display of a bendable electronic device 100 in a planar first form. FIG. 3G illustrates a first interface 300A that includes a first sub-interface 310 and a second sub-interface 320 and an example of a map/navigation application. The first sub-interface 310 may be, for example, an interface of a photographic street view of a particular location displayed in a map application. The second sub-interface 320 may be, for example, an interface of a planer map view of the particular location.

In response to determining that the form of display 110 of bendable electronic device 100 is a planar first form, the method 200-B displays the first interface 300-A. In some embodiments, a user may hold the bendable electronic device 100 in the planer first form in a vertical manner. Thus, the user may easily and conveniently compare an object, such as a building within sight of the user in the real world, with an object displayed in the first sub-interface 310 which may be for example a photographic street view of the building. Thus, the user may determine his or her position in the navigation application.

In another embodiment, the electronic device can be provided with an image capturing apparatus, which can be realized by a camera, etc. In a first example, the image capturing apparatus is arranged on a first surface of the electronic device, the display apparatus is arranged on a second surface of the electronic device, and the first surface is opposite to the second surface. That is to say, the image capturing apparatus is opposite to the display apparatus.

In some embodiments, the method 200-B may include a first application, such as a navigation application, that in response to determining 220-A that bendable electronic device is in the planer first form, enables a user to capture in real time, an image of his or her environment. In some embodiments, displaying a first interface of the first application, e.g. navigation application, may include displaying navigation information corresponding to the captured image being displayed. In some embodiments, the navigation information may be, for example, pre-stored in the bendable electronic device 100. In other embodiments, for example, related information (such as for example GPS information) of the environment in which the bendable electronic device 100 is located may be sent to a server, from which the navigation information may be obtained.

The navigation information may be, for example, route information or object parameter information, for example, various pieces of identifying information such as a type (restaurant, gas station, etc.) of the object in the image captured by the image capturing apparatus. In some embodiments, the navigation information and the image may be superimposed to form the first sub-interface. For example, as illustrated in FIG. 3G, the first sub-interface 310, e.g. street view map may display balloon/pin drop symbols 310-A and 310-B corresponding to the navigation information.

Figure 3H:
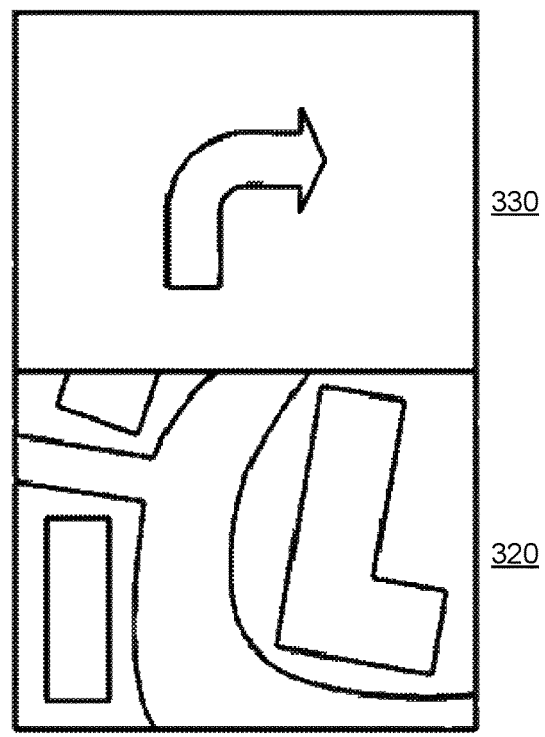
FIG. 3H is a schematic block diagrams illustrating an embodiment of a method of operating a display of a bendable electronic device in a curved second form.

In some embodiments, the method 200-B displays 240 an available 220-B second interface of the first application, the second interface adaptive to the second curved form, in response to determining 220-A that the display 110 is in the curved second form. For example, FIG. 3H is a schematic block diagrams illustrating an embodiment of a method of operating a display 110 of a bendable electronic device 100 in a curved second form. FIG. 3H illustrates a method of displaying a second interface of a navigation application that was described above with respect to FIG. 3G. It may be noted that for ease of illustration, display 110 of bendable electronic device 100 in the curved second form is depicted with the second interface 300B of the display 110 in the curved second form including a third sub-interface 330 and the second sub-interface 320.

Continuing the example, the second sub-interface 320 may be a map view interface as described above with respect to FIG. 3G. Because the display 110 of the bendable electronic device 100 is in the curved second form, the method 200-B may display 240 a simpler interface adaptive to the curved second form, such as for example, a direction icon/thumbnail pointing map illustrated in third sub-interface 330. Thus, the user may, for example, identify a particular location using the bendable electronic device 100 in the planer first form e.g. as a cell phone, a tablet, or GPS display. Then, the user may conveniently switch the form of the bendable electronic device 100 to the curved second form e.g. to be held around his or her arm or wrist. In the curved second form, the user may lift his or her wrist and conveniently see the third sub-interface 330, e.g. the direction icon/thumbnail pointing map.

Returning to FIG. 2B, in some embodiments, the method 200-B identifies 250 and displays 260 one or more third interfaces corresponding to one or more second applications in response to determining that the first application does not include an available second interface adaptive to the curved second form. In some embodiments, identifying 250 and displaying 260 the one or more third interfaces corresponding to the one or more second applications may include obtaining identification information for the one or more second applications and displaying an application selection interface for the one or more applications based on the identification information.

For example, in some embodiments, the one or more second applications may include various applications adaptive to a smaller display area of display 110 when the display 110 is in the curved second form. Displaying an application selection interface for the one or more second applications may include for example displaying identifying information e.g. in the form of icons that enable a user to select one or more of the one or more second applications such as described below with respect to FIG. 3D.

In some embodiments, the method 200-B may include determining for the one or more second applications an application usage frequency, an application type, and a working mode. This may be useful in identifying one or more second applications that may be particularly adaptive to the second curved form of the display 110 of the bendable electronic device 100. For example, in some embodiments, it may be useful to display identifying information e.g. application selection icons for one or more applications that are most frequently used by a particular user.

In some embodiments it may be useful to display identifying information e.g. application selection icons, for one or more applications that are of an application type that is particularly adaptive to the second curved form of the display 110. For example, a time display such as illustrated in FIG. 3C may be particularly useful display when the bendable electronic device 100 is being worn around a user's wrist like a smart watch. In some embodiments, the method may display a simplified interface such as a thumbnail player control interface illustrated in FIG. 3B in response to determining that the display 110 of the bendable electronic device 100 is in the curved second form.

FIG. 3A is a schematic block diagram illustrating one embodiment of a method of operating a display of a bendable electronic device in a planar first form. For example, a first application of the first type (e.g. adaptive to the planar first form of the display) may be a player application. The first interface may be a complete page of the player application as shown in FIG. 3A. The first interface may include a play control region of play/pause, fast forward, rewind, etc., but also comprises a volume control region as well as a picture-video display region or similar interface. When the display 110 is in the planar or near planar state, the user may easily see all of the display 110, and thus more detailed information may be suitably displayed.

In one embodiment, the method 200-B operates 230-B the display 110 of the bendable electronic device 100 in a first working mode in response to the display 110 of the bendable electronic device 100 being in the planar first form. For example, in some embodiments, the display 110 may be a touchscreen for displaying one or more interfaces of one or more second applications and collecting user input for the one or more second applications. Similarly, the method 200-B may further include operating the one or more second applications in a first or second working mode based on a predetermined condition such as those predetermined conditions described above and/or other predetermined conditions known in the art.

In other embodiments, the method 200-B operates 230-B the bendable electronic device 100 in accordance with the form of the bendable electronic device 100; namely the planar first form or the curved second form. If the current posture of the bendable electronic device 100 is in the planar first form, the message output mode of the electronic device is the first message output mode. If, however, at a next moment, the form of the bendable electronic device 100 changes from the planar first form to the curved second form, the first message output mode accordingly changes to a second message output mode.

The first message output mode can be specifically as follows: the prompt type of the first message output mode may be a ringing prompt and/or a vibration prompt, whereas the prompt type of the second message output mode may be a somatosensory prompt, namely a prompt which may be directly sensed by a wearing body part, so as to realize that when the user wears the bendable electronic device 100 on the body in the curved second form. The somatosensory prompt is relatively easily sensed by the user, such as vibration, current stimulation, and shrinkage or unfolding of the device, so that in a meeting or in class, other people cannot be disturbed while messages are received.

Furthermore, the second message output mode can be specifically as follows: a message priority mode, namely presetting priorities of applications in the electronic device 100, for instance, a first application is in a first priority, and a second application is in a second priority. When the electronic device is in the curved second form, the electronic device receives messages pushed by the first application, wherein the messages are preferentially pushed or are required to be pushed in any case. If the application with first priority pushes messages, the pushed messages with first priority are preferentially pushed, and then the pushed messages of the second application are pushed, wherein multiple priorities can be set so as to ensure that messages with relatively high priority can be checked in time when there are too many messages, and important messages are prevented from being missed. Meanwhile, the messages pushed by the applications with relatively low priority can also be pushed and displayed, and the messages are sequentially checked according to the priorities.

In addition, the second message output mode corresponding to the curved second form is a message priority mode, which can be specifically as follows: controlling the electronic device to output preset messages of applications in a first set when the electronic device 100 is in the curved second form, and storing messages of applications not in the first set, i.e., only outputting the messages pushed by the application with relatively high priority, and storing the messages pushed by the application with relatively low priority; and only when the electronic device 100 changes into the planar first form, outputting the stored messages pushed by the application with relatively low priority.

For example, when the electronic device 100 is in the curved second form, messages output by the electronic device 100 may include basic functional applications such as incoming calls, text messages, time, and alarm clock, as well as applications applicable to the watch mode, such as an exercise app, QQ and WeChat. In other words, a first set includes the basic functional applications such as incoming calls, text messages, time, and alarm clock, as well as the applications applicable to the watch mode, such as an exercise app, QQ and WeChat; applications not in a first set may include reading applications such as Tencent news and a novel app, shopping applications such as Mobile Taobao, as well as video applications such as IQIYI; and the messages pushed by the applications not in the first set are output only when the electronic device 100 is in the planar first form.

The second message output mode corresponding to the planar first form can be specifically as follows: when the current form of the electronic device 100 is in the planar first form, controlling the electronic device 100 to output preset messages of applications in a second set, wherein the messages of the applications in the second set include messages generated by the applications in the second set when the electronic device 100 is in the planar first form, or the messages stored when the electronic device 100 is in the curved second form. In other words, when the electronic device 100 is in the planar first form, the electronic device 100 checks the messages generated by all the applications in the second set and the unchecked messages when the electronic device 100 is in the curved second form. All the applications in the second set can be specifically as follows: all applications of the electronic device, and also applications with other priorities.

As depicted in FIG. 3A, in the planar first mode, the whole touchscreen may be active with high sensitivity. For example, as illustrated in FIG. 3A the first interface may include a progress bar and a volume slider control for an audio player application. The progress bar and/or the volume slide control may collect input from a user for adjusting the playback position and/or the volume of the audio player application.

In some embodiments, the bendable electronic device 100 may operate the display (e.g. the touchscreen) in a second working mode, in response to display 110 of the bendable electronic device 100 being in the curved second form. For example, as illustrated in FIG. 3B the touchscreen may be partially active and may include a limited control touch interface for the audio player application, e.g. simple touch controls such as back, pause, stop, and forward.

In some embodiments, the method 200-B may include determining whether a predetermined condition for the one or more second applications is met. The method may further include switching the one or more second applications from a first working mode to a second working mode in response to determining that the predetermined condition is met. In one embodiment, the predetermined condition may be met, for example, by the display 110 of the bendable electronic device 100 being in the curved second form.

In one embodiment, the predetermining condition may be met by the passing of a predetermined time. For example, an interface of display 110 may operate in a first working mode where touch controls (e.g. back, pause, stop, and play) may be active in the first working mode. In response to the passing of the predetermined time, the touch controls may be locked to prevent unintentional activation of the controls and/or to reduce power consumption of the bendable electronic device 100. A third interface such as a lock symbol may be displayed above the second interface to indicate that the touch control interface is locked and/or in a second working mode (e.g. a low power mode).

In some embodiments, the predetermined condition may include receiving a user input. For example, as depicted in FIG. 3D, the display 110 may display a first interface that displays the time, e.g. 10:30. The display 110 may further display one or more second interfaces based on identifying information for one or more second applications, e.g. a chat application depicted as a chat icon and weather application depicted by a rain cloud icon.

In response to the predetermined condition being met by a user touching the chat icon, the bendable electronic device 100 may switch from first operating mode (which may be a low power mode) in which the display 110 displays the application selection interfaces, e.g. the chat icon and the weather icon to second operating mode such as for example a chat application mode in which the method further comprising transferring data over a wireless network connection such as a chat message. The second operating mode may consume more power in order to transfer message data.

In some embodiments, the predetermined condition may be detecting a predetermined movement. For example, a user raising an arm or twisting a wrist may cause one or more interfaces to be displayed with increased brightness. Thus, the method 200-B ends. Those skilled in the art can understand that switching from the first operating mode to the second operation mode in response to a predetermined condition being met such as a form parameter indicating that the display 110 of the bendable electronic device 100 is switched from the planar first form to the curved second form, may occur in response to any of one or more predetermined conditions being met, in any order, such as for example a combination of the passing a predetermined time, receiving a predetermined input, and detecting a predetermined movement.

Figure 4:
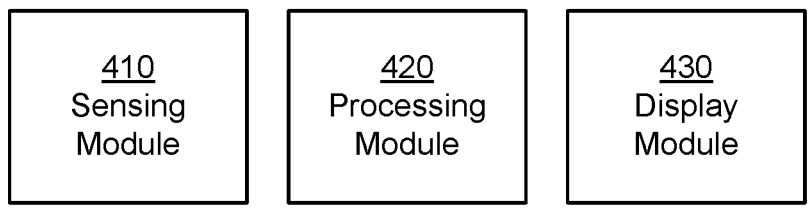
FIG. 4 is a schematic block diagram illustrating one embodiment of bendable electronic device comprising a display and modules that perform various functions.

FIG. 4 is a schematic block diagram illustrating one embodiment of an apparatus 400 for displaying interfaces on a bendable electronic device 100 comprising a display 110. In one embodiment, the apparatus 400 includes a sensing module 410 that determines whether the display 110 of a bendable electronic device 100 is in a planer first form or in a curved second form. In some embodiments, the sensing module 410 determines that the display 110 of the bendable electronic device 100 is in the curved second form include determining that a bending degree of the display 110 exceeds a predetermined threshold.

In some embodiments, the sensing module 410 include a plurality of light sensors associated with the display 110 of the bendable electronic device 100. The plurality of light sensors in light detection array that measure a difference in light received from a light source at the plurality of light sensors as described above with respect to FIGS. 1B and 2A. In some embodiments, the sensing module 410 may include a bend sensor 130 associated with the bendable electronic device 100. The sensing module 410 may perform the methods described above with respect to FIG. 2A.

The apparatus 400 further includes a processing module 420 that determines whether a first application comprising a first interface further comprises an available second interface adaptive to the curved second form. For example, the processing module 420 may access a first application such as a system application, a factory install application, or a user install application, to obtain information indicating whether the application includes a second interface adaptive to the curved second form as described above with respect to the methods described above with respect to FIGS. 2A and 2B.

In some embodiments, the processing module 420 obtains identifying information for one or more second applications and causes the display module to display an application selection interface for the one or more second applications. In some embodiments, the processing module 420 further determines whether a predetermined condition is met for the one or more second applications; and causes the one or more second applications to switch from a first working mode to a second working mode in response to determining that the predetermined condition is met.

For example, in some embodiments, the processing module 420 may switch the display 110 and/or other elements in to a lower power mode, for example in response to a predetermined condition being met such as the bendable electronic device 100 switching from a planar first form to a curved second form. Similarly, the processing module 420 may determine whether any predetermined condition is met as described above with respect to FIGS. 2A, 2B, and 3A-3H.

For example, in some embodiments, the predetermined conditions may include passing a predetermined time, receiving a predetermined input and/or detecting a predetermined movement. For example, in some embodiments, the processing module 420 may determine whether a first predetermined condition has been met that includes a combination of a second predetermined condition, a third predetermined condition, and so forth. For example, a first predetermined condition may include receiving a particular input. This may be, in some embodiments, a user input through a touch interface, a software input from one or more applications, a hardware input from one or more components within the bendable electronic device 100.

In some embodiments, the bendable electronic device 100 may include a wireless communication interface from which the processing module 420 may receive input from another device such as an input from a device transferred to the bendable electronic device 100 over the network connection. For example, the bendable electronic device 100 may be in a second working mode that is a low power consumption working mode. For example, the locked mode depicted in FIG. 3F may be a low power working mode. The processing module 420 may receive input from an application such as a chat application illustrated in FIG. 3E, whereby the processing module 420 may cause display module 430 to display a second interface, e.g. the chat interface, in response to the processing module 420 determining that the predetermined condition has been met, e.g., receiving a chat message input.

The apparatus 400 includes a display module 430 that displays the first interface of the first application in response determining that the display 110 of the bendable electronic device 100 is in the planar first form. The display module 430 further displays one or more third interfaces corresponding to one or more second applications in determining that the bendable electronic device 100 is in the curved second form and in response to determining that the first application does not comprise an available second interface adaptive to the curved second form. For example, various second applications are described above with respect to FIGS. 3A to 3H.

Figure 5:
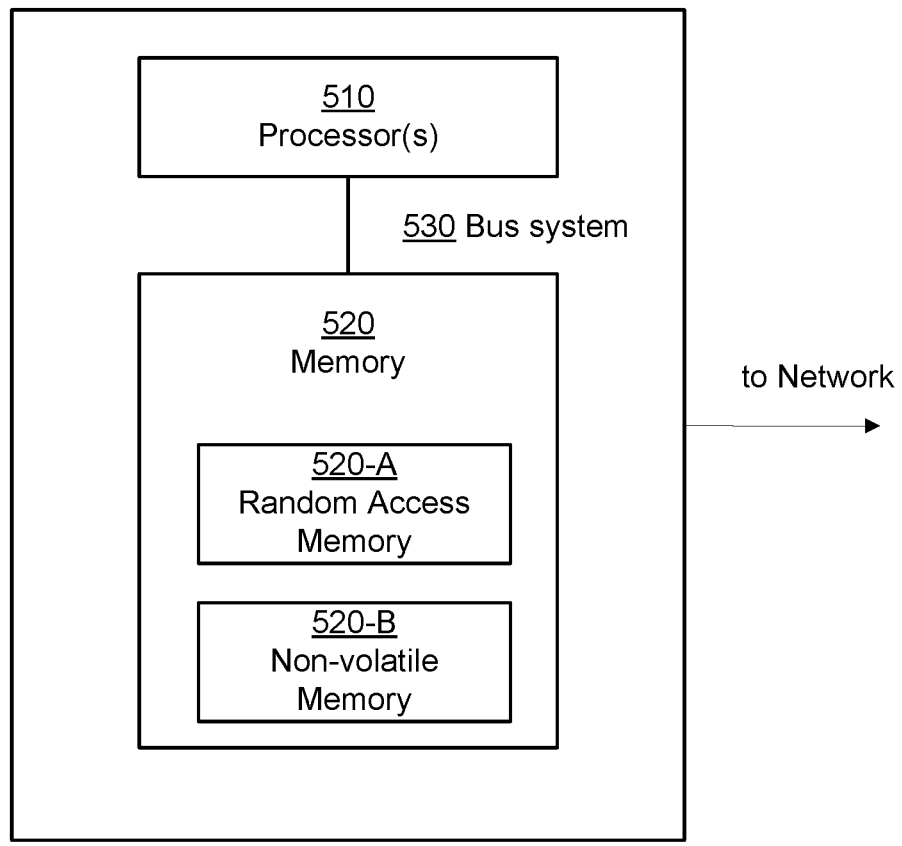
FIG. 5 is a schematic block diagram illustrating one embodiment of particular structural elements of a bendable electronic device comprising a display.

FIG. 5 is a schematic block diagram illustrating one embodiment an apparatus 500 for performing processing display interfaces for the display 110 of the bendable electronic device 100. In some embodiments, the apparatus 500 may include one or more processors 510 and one or more memories 520 that are interconnected by a bus system 530 and/or other manners of connecting mechanisms (not shown). It may be noted that the components and structures of the display processing apparatus 500 as shown in FIG. 5 are exemplarily rather than limiting, and as described at the beginning of the detailed description, the apparatus 500 may comprise modules that include hardware and/or software, as well as other components and structures.

The processor 510 may be a central processing unit (CPU) or other forms of a processing unit with a data processing capacity and/or instruction executing capacity, and may control other components in the apparatus 500 to execute expected functions. The memory 520 may include one or more computer program products that can include various forms of computer readable storage media such as volatile memory and/or nonvolatile memory. The volatile memory, for example, can include random access memory (RAM) and/or cache memory (cache) and the like. The non-volatile memory, for example, can include a read only memory (ROM), a hard disk, a flash memory and the like. One or more computer program instructions can be stored on the computer readable storage medium, and the processor 510 can operate the program instructions to implement the functions of the display processing method according to the embodiment of the present invention and/or other expected functions.

In one embodiment, a program product comprising a computer readable storage medium stores code executable by a processor the executable code comprising code to perform determining whether a bendable electronic device comprising a display is in a planar first form or a curved second form. The code is further executable by a processor to perform displaying a first interface of a first application in response to determining that the bendable electronic device is in the planer first form and displaying an available second interface of the first application, adaptive to a second curved form, in response to determining that the bendable electronic device is in the curved second form. The program product may be executable by the processor and/or any of the sensing module 410, the processing module 420, and the display module 430, to perform the functions described above with respect to FIGS. 2A, 2B and 3A-3H.

Thus, the various embodiments of the methods, apparatus, and computer program product improve the function of an electronic device such as for example a cell phone, a tablet, a smart watch, a navigation device, by providing methods and functions that display application interfaces for a variety of applications in response to whether the display 110 of the bendable electronic device 100 is in a planar first form or in a curved second form. Similarly, the display 110 of the bendable electronic device 100 may also be responsive to various combinations of predetermined conditions that may be set by a user, or by a vendor of the device and/or one or more applications for the device.

What is claimed is:

1. A method comprising:
   determining whether a display of a bendable electronic device is in a planar first form or in a substantially annular second form using a plurality of light sensors in a light sensing array arranged in a manner corresponding to a light emitting array of the display;
   operating a first working mode of a first application in response to determining that the display is in the planer first form; and
   operating a second working mode of the first application, the second working mode adaptive to the substantially annular second form, in response to determining that the display is in the substantially annular second form.

2. The method of claim 1, wherein operating the first working mode and operating the second working mode of the first application comprise displaying a first interface and displaying a second interface of the first application respectively.

3. The method of claim 1, wherein determining that the display of the bendable electronic device is in the substantially annular second form comprises determining that a bending degree of the display exceeds a predetermined threshold.

4. The method of claim 3, wherein the bending degree of the display is determined by measuring a difference in light received at a plurality of points within the light sensing array.

5. The method of claim 2, further comprising displaying one or more third interfaces corresponding to one or more second applications in response to determining that the first application does not include an available second interface adaptive to the substantially annular second form.

6. The method of claim 5, wherein displaying the one or more third interfaces corresponding to the one or more second applications comprises:
   obtaining identifying information for one or more second applications; and
   displaying an application selection interface for the one or more second applications based on the identifying information.

7. The method of claim 1, further comprising switching the first application from the first working mode to the second working mode in response to determining that the display of the bendable electronic device is adapted from the planar first form to the substantially annular second form.

8. The method of claim 7, wherein the first working mode and the second working mode have different power consumptions.

9. The method of claim 7, further comprising determining whether a predetermined condition for one or more second applications is met, wherein the predetermined condition comprises one or more of passing a predetermined time, receiving a predetermined input, and detecting a predetermined movement.

10. The method of claim 7, wherein the first working mode and the second working mode comprise different message output modes for prompting an incoming message that is received by the bendable electronic device.

11. An apparatus comprising: a display of a bendable electronic device; a light detection array comprising a plurality of light sensors arranged in a manner corresponding to a light emitting array of the display; one or more processors; and a memory storing code that is executable by the one or more processors to: determine, based on signals from the light detection array, whether the display is in a planar first form or in a substantially annular second form; operate a first working mode of a first application in response to determining that the display of the bendable electronic device is in the planar first form; and operate a second working mode of the first application in response to determining that the display of the bendable electronic device is in the substantially annular curved second form.

12. The apparatus of claim 11, wherein the code is executable by the one or more processors to display a first interface and a second interface of the first application responsive to the first application operating the first working mode and the second working mode respectively.

13. The apparatus of claim 11, wherein determining that the display of the bendable electronic device is in the substantially annular second form comprises determining that a bending degree of the display exceeds a predetermined threshold.

14. The apparatus of claim 13, wherein the bending degree of the display is determined by measuring a difference in light received at a plurality of points within the light sensing array.

15. The apparatus of claim 11, wherein the one or more processors further:
   obtain identifying information for one or more second applications; and
   cause the display to display an application selection interface for the one or more second applications.

16. The apparatus of claim 15, wherein the one or more processors further cause the one or more second applications to switch from the first working mode to the second working mode in response to determining that the display of the bendable electronic device is adapted from the planar first form to the substantially annular second form.

17. The apparatus of claim 16, wherein the one or more processors further determine whether a predetermined condition for one or more second applications is met, wherein the predetermined condition comprises one or more of passing a predetermined time, receiving a predetermined input, and detecting a predetermined movement.

18. The apparatus of claim 11, wherein the first working mode and the second working mode comprise different message output modes for prompting an incoming message that is received by the bendable electronic device.

19. The apparatus of claim 18, wherein in the substantially annular second form, the bendable electronic device is wearable around a body part of a user.

20. A program product comprising a computer readable storage medium that stores code executable by a processor, the executable code comprising code to perform:
   determining whether a bendable electronic device comprising a display is in a planar first form or a substantially annular second form by measuring a difference in light received at a plurality of points within a light sensing array arranged in a manner corresponding to a light emitting array of the display;

operating a first working mode of a first application in response to determining that the bendable electronic device is in the planer first form; and operating a second working mode of the first application, adaptive to a second substantially annular form, in response to determining that the bendable electronic device is in the substantially annular second form.

* * * * *